United States Patent
Park et al.

(10) Patent No.: US 12,504,186 B2
(45) Date of Patent: Dec. 23, 2025

(54) AIR PURIFIER AND METHOD FOR CONTROLLING SAME

(71) Applicant: Samsung Electronics Co., Ltd., Suwon-si (KR)

(72) Inventors: Heejin Park, Suwon-si (KR); Sungwon Kim, Suwon-si (KR); Jeeyeon Kim, Suwon-si (KR); Saemi Kim, Suwon-si (KR); Joonho Kim, Suwon-si (KR); Yongwon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 889 days.

(21) Appl. No.: 17/718,960

(22) Filed: Apr. 12, 2022

(65) Prior Publication Data

US 2022/0235955 A1 Jul. 28, 2022

Related U.S. Application Data

(63) Continuation of application No. PCT/KR2019/016899, filed on Dec. 3, 2019.

(30) Foreign Application Priority Data

Oct. 18, 2019 (KR) .......................... 10-2019-0129698

(51) Int. Cl.
 *F24F 8/167* (2021.01)
 *F24F 11/52* (2018.01)
 *F24F 11/62* (2018.01)

(52) U.S. Cl.
 CPC .............. *F24F 8/167* (2021.01); *F24F 11/52* (2018.01); *F24F 11/62* (2018.01)

(58) Field of Classification Search
 CPC . F24F 8/158; F24F 8/167; F24F 11/62; A61L 9/205
 See application file for complete search history.

(56) References Cited

U.S. PATENT DOCUMENTS 10,722,605 B2 7/2020 Kim et al.
2016/0121265 A1 5/2016 Kanda et al.
(Continued)

FOREIGN PATENT DOCUMENTS

JP 2002-238981 A 8/2002
JP 4158651 B2 10/2008
(Continued)

OTHER PUBLICATIONS

Korean Office Action dated Dec. 8, 2023, issued in Korean Application No. 10-2019-0129698.

*Primary Examiner* — Timothy C Cleveland
(74) *Attorney, Agent, or Firm* — Jefferson IP Law, LLP

(57) ABSTRACT

An air purifier and a method for controlling the same are provided. The air purifier includes a fan for suctioning air, an odor sensor for sensing a concentration of odor, a hybrid filter including activated carbon and a photocatalyst, and a light emitting diode (LED) arranged in an area where the photocatalyst included in the hybrid filter is positioned and emitting light. Identification is made as to whether the concentration of odor exceeds a first threshold value, the fan is driven to suction air to reduce the concentration of odor when the concentration of odor exceeds the first threshold value, and the LED emits light to the photocatalyst based on a concentration of carbon dioxide in the air if the sensed concentration of odor is not reduced to a second threshold value after a threshold time since driving of the fan.

11 Claims, 12 Drawing Sheets

(56) References Cited

U.S. PATENT DOCUMENTS

2018/0104374 A1   4/2018  Kim et al.
2018/0283707 A1  10/2018  Scheja et al.

FOREIGN PATENT DOCUMENTS

| JP | 2019-500066 A | 1/2019 |
|---|---|---|
| JP | 6491767 B2 | 3/2019 |
| KR | 10-0445761 B1 | 8/2004 |
| KR | 10-2005-0080285 A | 8/2005 |
| KR | 10-0654726 B1 | 12/2006 |
| KR | 10-0778669 B1 | 11/2007 |
| KR | 10-1553665 B1 | 9/2015 |
| KR | 10-2016-0109846 A | 9/2016 |
| KR | 10-2018-0043163 A | 4/2018 |
| KR | 10-2018-0090203 A | 8/2018 |
| KR | 10-2018-0094158 A | 8/2018 |
| KR | 10-1894477 B1 | 9/2018 |
| KR | 10-2297635 B1 | 9/2021 |
| WO | 2017/120973 A1 | 7/2017 |

SIDE SURFACE OF
HYBRID FILTER

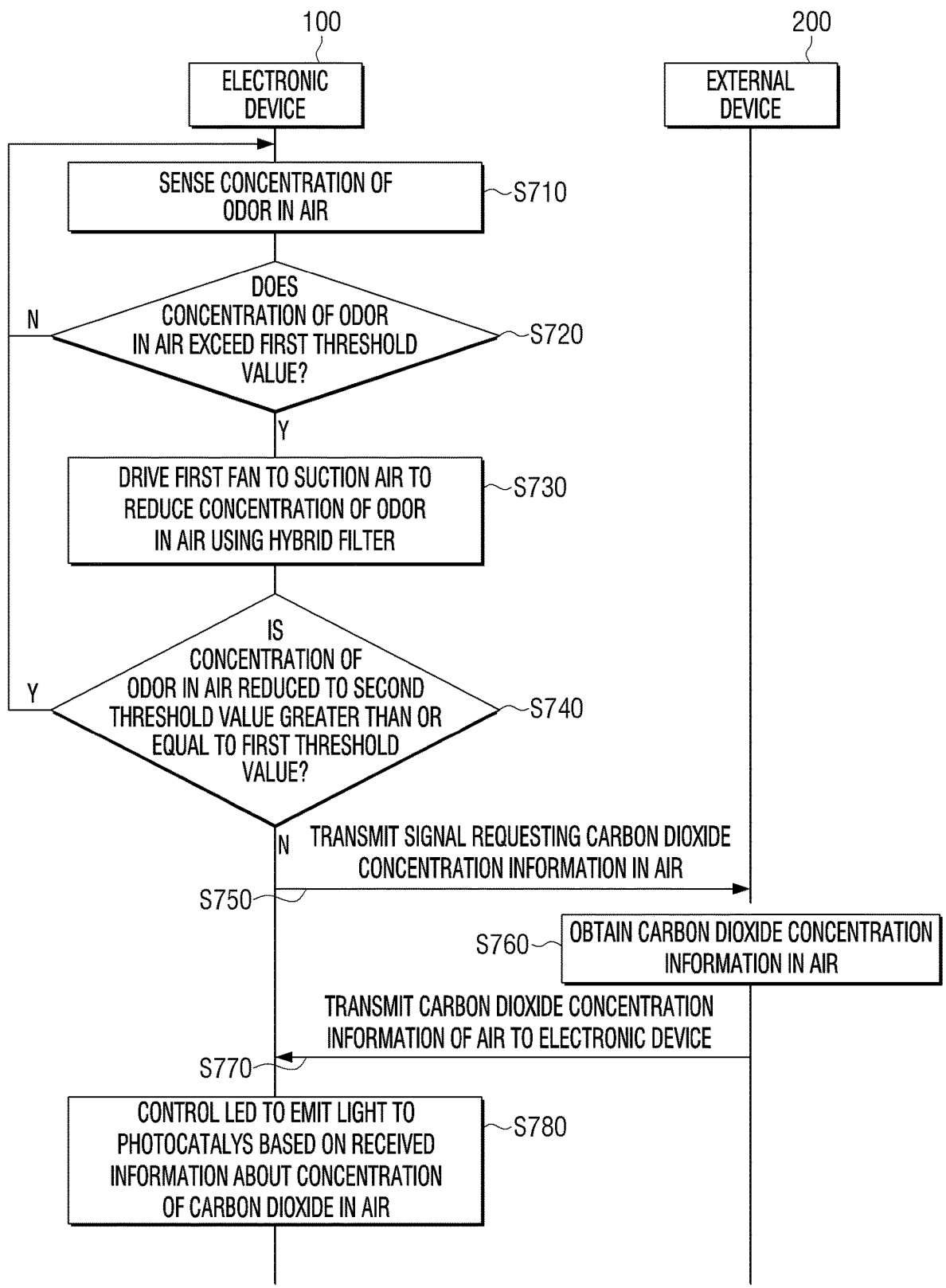

AIR PURIFIER AND METHOD FOR CONTROLLING SAME

CROSS-REFERENCE TO RELATED APPLICATION(S)

This application is a continuation application, claiming priority under § 365(c), of an International application No. PCT/KR2019/016899, filed on Dec. 3, 2019, which is based on and claims the benefit of a Korean patent application number 10-2019-0129698, filed on Oct. 18, 2019, in the Korean Intellectual Property Office, the disclosure of which is incorporated by reference herein in its entirety.

BACKGROUND

1. Field

The disclosure relates to an air purifier and a method for controlling same. More particularly, the disclosure relates to an air purifier to reduce concentration of odor in the air using a hybrid filter including an activated carbon and a photocatalyst and a method for controlling thereof.

2. Description of Related Art

Amid rapidly increasing demand for an air purifier to purify indoor air due to air pollution, fine dust, yellow dust, and the like, various types of air purifiers have been developed and produced.

For example, an adsorption-type air purifier purifies air in a manner of adsorbing gas contained in the air using activated carbon, which is a porous adsorbent. The adsorption-type air purifier has an advantage of low production cost and excellent initial performance. However, when the adsorption-type air purifier is used continuously, there is a limitation that bad odor may be generated and filter replacement is required.

In another example, a decomposition-type air purifier may purify air by emitting light to a photocatalyst material to generate a radical having strong oxidizing power, and decomposing gas through the radical. The decomposition-type air purifier may be semi-permanently used and has an advantage of not generating bad odor by completely decomposing gas, but there is a limit in that production costs and energy consumption are higher than that of an adsorption-type air purifier.

In the related art, a technology of applying a multi-step filter in which a plurality of filters are coupled to an air purifier has been developed, but the multi-step filter has a limitation that the thickness of the multi-step filter may increase and the pressure loss may increase.

In the related art, a hybrid material filter that may utilize both the adsorption and decomposition has been developed, but there is a limitation in that dust is generated and efficiency of the photocatalyst is reduced.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure relates to an air purifier and a control method thereof, capable of purifying air by using a hybrid filter including activated carbon and a photocatalyst in the form of beads and regenerating a filter based on the concentration of carbon dioxide.

Additional aspects will be set forth in part in the description which follows and, in part, will be apparent from the description, or may be learned by practice of the presented embodiments.

In accordance with an aspect of the disclosure, an air purifier is provided. The air purifier includes a first fan for suctioning air, an odor sensor for sensing concentration of odor in air, a hybrid filter comprising activated carbon and a photocatalyst, a light emitting diode (LED) arranged in an area where the photocatalyst included in the hybrid filter is positioned and emitting light, and a processor to identify whether concentration of odor in the air sensed through the odor sensor exceeds a first threshold value, drive the first fan to suction air in order to reduce the concentration of odor in the air by using the hybrid filter, based on the concentration of odor in the air being identified to exceed the first threshold value, and control the LED to emit light to the photocatalyst based on the concentration of carbon dioxide in the air based on the concentration of odor in the air sensed through the odor sensor being not reduced to a second threshold value equal to or greater than the first threshold value after a threshold time since driving of the first fan.

The activated carbon and the photocatalyst are configured to a form of a bead.

The air purifier may further include a carbon dioxide sensor for sensing concentration of carbon dioxide in the air, and the processor may control the LED to emit light to the photocatalyst based on concentration of carbon dioxide in the air sensed through the carbon dioxide sensor.

The air purifier may further include a communicator comprising a circuit, and the processor may receive, from the external device, information about concentration of carbon dioxide in the air through the communicator, and control the LED to emit light to the photocatalyst based on the information about concentration of carbon dioxide in the received air.

The processor may identify whether concentration of carbon dioxide in the air exceeds a third threshold value, and based on the concentration of carbon dioxide in the air not exceeding the third threshold value, control the first fan to stop operation and control the LED to emit light to the photocatalyst.

The air purifier may include an air conditioning unit, and the processor may, based on identifying that concentration of carbon exceeds the third threshold value, control the air conditioning unit so that concentration of carbon dioxide in the air is reduced to less than or equal to the third threshold value, and based on the concentration of carbon dioxide in the air being reduced to the third threshold value or less after controlling the air conditioning unit to operate, control the first fan to stop operation and control the LED to emit light to the photocatalyst.

The air purifier may further include a heater, and the processor may, based on operation of the first fan being stopped, increase a rate of diffusing gas adsorbed to the activated carbon to the photocatalyst by controlling the heater to heat the hybrid filter.

The air purifier may include a second fan for circulating air inside the air purifier, and the processor may, based on the operation of the first fan being stopped, increase a rate of diffusing gas adsorbed to the activated carbon to the photocatalyst by driving the second fan to circulate air inside the air purifier.

At least one of a pre filter or a high efficiency particulate air (HEPA) filter may be arranged on a surface of the LED.

The air purifier may further include a display, and the processor may control the display to display a message to close an external window after controlling the LED to emit light to the photocatalyst based on concentration of carbon dioxide in the air.

In accordance with another aspect of the disclosure, a method of controlling an air purifier is provided. The method includes a first fan for suctioning air, an odor sensor for sensing concentration of odor in air, a hybrid filter comprising activated carbon and a photocatalyst, and a light emitting diode (LED) arranged in an area where the photocatalyst included in the hybrid filter is positioned and emitting light includes identifying whether concentration of odor in the air sensed through the odor sensor exceeds a first threshold value, driving the first fan to suction air in order to reduce the concentration of odor in the air by using the hybrid filter, based on the concentration of odor in the air being identified to exceed the first threshold value, and controlling the LED to emit light to the photocatalyst based on the concentration of carbon dioxide in the air based on the concentration of odor in the air sensed through the odor sensor being not reduced to a second threshold value equal to or greater than the first threshold value after a threshold time since driving of the first fan.

The activated carbon and the photocatalyst are configured to a form of a bead.

The controlling the LED may include sensing concentration of carbon dioxide in air through a carbon dioxide sensor, and controlling the LED to emit light to the photocatalyst based on the sensed concentration of carbon dioxide in the air sensed.

The controlling the LED may include receiving information about concentration of carbon dioxide in the air from an external device, and controlling the LED to emit light to the photocatalyst based on the information about concentration of carbon dioxide in the received air.

The controlling the LED may include identifying whether concentration of carbon dioxide in the air exceeds a third threshold value, and based on the concentration of carbon dioxide in the air not exceeding the third threshold value, controlling the first fan to stop operation and controlling the LED to emit light to the photocatalyst.

The controlling the LED may include, based on identifying that concentration of carbon exceeds the third threshold value, controlling the air conditioning unit so that concentration of carbon dioxide in the air is reduced to less than or equal to the third threshold value, and based on the concentration of carbon dioxide in the air being reduced to the third threshold value or less after controlling the air conditioning unit to operate, controlling the first fan to stop operation and controlling the LED to emit light to the photocatalyst.

The controlling the LED may include, based on operation of the first fan being stopped, increasing a rate of diffusing gas adsorbed to the activated carbon to the photocatalyst by controlling the heater to heat the hybrid filter.

The controlling the LED may include, based on the operation of the first fan being stopped, increasing a rate of diffusing gas adsorbed to the activated carbon to the photocatalyst by driving the second fan to circulate air inside the air purifier.

At least one of a pre filter or a high efficiency particulate air (HEPA) filter may be arranged on a surface of the LED.

The controlling the LED may include displaying a message to close an external window after controlling the LED to emit light to the photocatalyst based on concentration of carbon dioxide in the air.

By the various embodiments of the disclosure as described above, by implementing an activated carbon and a photocatalyst of a hybrid filter in a bead type thereby preventing the thickness of a filter from becoming thicker and pressure loss from increasing.

Through the air purifier according to various embodiments of the disclosure, concentration of odor in the air may be reduced, and the filter is regenerated based on concentration of carbon dioxide in the air so that a user may be provided with a more pleasant indoor environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a sequence diagram illustrating a process of receiving carbon dioxide information by the air purifier from an external server according to an embodiment of the disclosure;

Throughout the drawings, it should be noted that like reference numbers are used to depict the same or similar elements, features, and structures.

DETAILED DESCRIPTION

Figure 1:
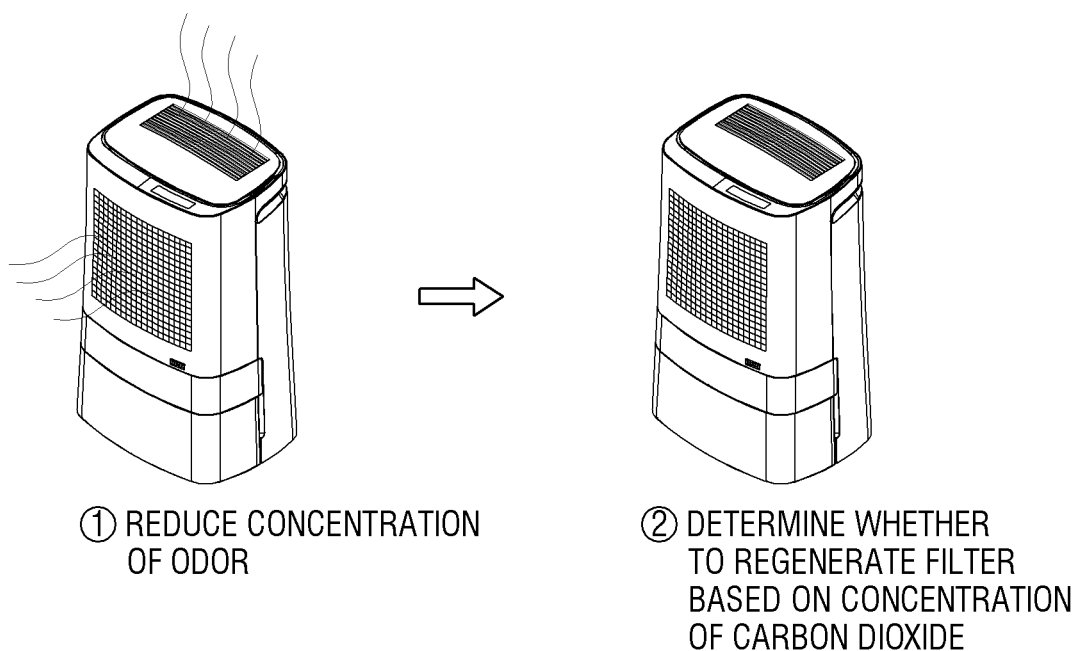
FIG. 1 is a diagram illustrating an operation of an air purifier according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first," "second," or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of" The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

Embodiments of the disclosure will now be described in detail with reference to the attached drawings.

FIG. 1 is a diagram illustrating the operation of an air purifier 100, according to an embodiment of the disclosure.

Referring to FIG. 1, in an embodiment, the air purifier 100 may be implemented with a movable robot-type air purifier and various electronic devices (e.g., air conditioner, cooler/heater, humidifier, etc.) including an air purifying function.

The air purifier 100 may identify whether the concentration of odor sensed through an odor sensor exceeds a first threshold value. The air purifier 100 may receive information on the concentration of odor in the air from an external device. The external device is an Internet of Things (IoT) device present in a house, and may be a device including a plurality of sensors (e.g., a temperature sensor, a humidity sensor, a gas sensor, an odor sensor, a carbon dioxide detection sensor, etc.) capable of obtaining information about an indoor environment in the house. The external device may be a hub device (or a home gateway device) that collects information about an indoor environment from a plurality of IoT devices present in the house.

If the concentration of odor in the air exceeds the first threshold value, the air purifier 100 may drive a first fan to reduce the concentration of odor in the air by using a hybrid filter including activated carbon and a photocatalyst implemented in a bead form. The air purifier 100 may adsorb gas contained in the suctioned air using activated carbon to reduce the concentration of odor in the air. The air purifier 100 may generate radicals by controlling light emitting diodes (LEDs) to emit light to the photocatalyst. The air purifier 100 may decompose the gas contained in the air through the generated radicals to reduce the concentration of odor in the air. For example, the air purifier may sterilize various pathogens and bacteria using the generated radical, decompose and remove harmful substances such as nitrogen oxides (NOX), sulfur oxides (SOX), formaldehyde, etc., in the air, decompose stinky materials such as acetaldehyde, ammonia, hydrogen sulfide, etc., decompose organic materials such as tobacco smoke and oil residue, and decompose harmful organic compounds of wastewater.

The activated carbon and the photocatalyst included in the hybrid filter will be described in detail with reference to FIGS. 3A and 3B.

As an embodiment, the air purifier 100 may include at least one of a pre filter or a high-efficiency particulate air (HEPA) filter. The pre filter or the HEPA filter may be arranged on one side of the LED.

If the concentration of odor in the air sensed through the odor sensor is not reduced to a second threshold value greater than or equal to the first threshold value after a threshold time since driving of the first fan, the air purifier 100 may regenerate the hybrid filter based on the concentration of carbon dioxide in the air. When the concentration of odor in the air is not reduced to a second threshold value greater than or equal to the first threshold value, the amount of gas adsorbed on the activated carbon may exceed a threshold value so that the performance of the hybrid filter may be deteriorated. The air purifier 100 may stop the operation of the first fan to regenerate the hybrid filter, and may control the LED to emit light to the photocatalyst based on the concentration of carbon dioxide in the air. The air purifier 100 may maintain the initial performance of the hybrid filter by removing the diffused gas after being adsorbed on the activated carbon by using radicals generated by emitting light to the photocatalyst through the LED.

According to an embodiment, the air purifier 100 may identify whether concentration of carbon dioxide in the air obtained from a carbon dioxide sensor or an external device exceeds a third threshold value (e.g., 1000 ppm). When decomposing gas included in the activated carbon through the photocatalyst, carbon dioxide may be generated, so the air purifier 100 may identify whether the concentration of carbon dioxide exceeds the third threshold value preliminarily.

As an embodiment, if it is identified that the concentration of carbon dioxide does not exceed a third threshold value, the air purifier 100 may control to stop the operation of the first fan and may control the LED to emit light to the photocatalyst.

According to an embodiment, if it is identified that the concentration of carbon dioxide in the air exceeds the third threshold value, the air purifier 100 may control an air conditioning unit so that the concentration of carbon dioxide in the air decreases to a third threshold value or less. The air purifier 100 may drive the first fan to suction air, and control the air conditioning unit to adsorb and remove carbon dioxide contained in the air. When the concentration of carbon dioxide in the air is reduced below or equal to the third threshold value, the air purifier 100 may control the LED to stop the operation of the first fan and emit light to the photocatalyst. The air conditioning unit may remove carbon dioxide contained in the suctioned air. A detailed description of the air conditioner will be described in detail with reference to FIG. 2B.

According to a still another embodiment, if it is identified that the concentration of carbon dioxide in the air exceeds the third threshold value, the air purifier 100 may display a message indicating the concentration of carbon dioxide in the air needs to be reduced by ventilating indoor air.

The air purifier 100 may detect the concentration of carbon dioxide in the air through a carbon dioxide sensor, but this is merely exemplary, and may receive information about the concentration of carbon dioxide in the art from an external device. An embodiment of receiving information about concentration of carbon dioxide through an external device will be described in detail with reference to FIG. 7.

When the operation of the first fan is stopped, the air purifier 100 may increase the rate of diffusion of the gas adsorbed on the activated carbon to the photocatalyst. In an embodiment, the air purifier 100 may control the heater to heat the hybrid filter, and may increase the rate of diffusion of the gas adsorbed on the activated carbon to the photocatalyst. In another embodiment, the air purifier 100 may drive the second fan to circulate the air in the air purifier, and may increase the rate of diffusion of the gas adsorbed on the activated carbon to the photocatalyst. An embodiment related to a method of increasing a diffusion rate will be described in detail with reference to FIG. 6.

According to an embodiment, the LED may be controlled to emit light based on the concentration of carbon dioxide in the air, and after a predetermined time, the air purifier 100 may display a message to close an external window. If the air purifier 100 operates in a state where the external window is opened, efficiency of the air purifier 100 may be reduced, so the air purifier 100 may display a message to close the external window. However, the air purifier 100 may output a voice corresponding to a message including the meaning of closing the external window. The air purifier 100 may control the concentration of odor in the air to be less than or equal to the first threshold value by identifying whether the concentration of odor of the air sensed through the odor sensor exceeds the first threshold value.

Figure 2A:
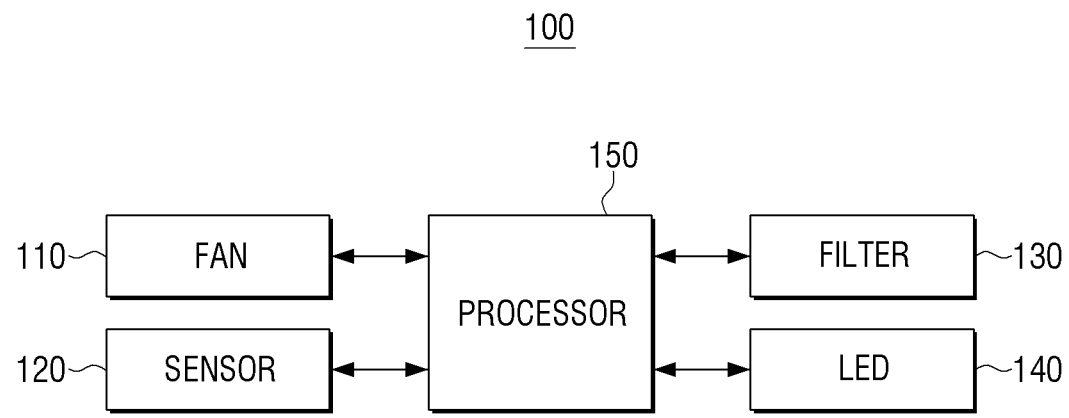
FIG. 2A is a block diagram schematically illustrating a configuration of an air purifier according to an embodiment of the disclosure.

FIG. 2A is a block diagram schematically illustrating a configuration of the air purifier 100, according to an embodiment of the disclosure.

Referring to FIG. 2A, the air purifier 100 may include a fan (e.g., a first fan) 110, a sensor 120, a filter 130, an LED (e.g., an LED module) 140, and a processor 150. The configurations shown in FIG. 2A are exemplary for implementing embodiments of the disclosure, and any suitable hardware/software configuration that would be obvious to a person skilled in the art may be further included in the air purifier 100.

The fan 110 may include a first fan for suctioning air into the air purifier 100 and a second fan for circulating air inside the air purifier 100. The fan 110 may change the speed (or revolutions per minute (RPM)) for suctioning air by the control of the processor 150, and the speed of circulating the air inside the air purifier 100.

The sensor 120 may sense various information around the air purifier 100. The sensor 120 may include an odor sensor to sense concentration of odor in the air, a carbon dioxide sensor capable of sensing concentration of carbon dioxide, a sensor for sensing concentration of fine dust, a sensor for sensing gas, or the like. The sensor 120 may include an image sensor (or camera) to photograph the outside of the air purifier 100.

According to an embodiment, the sensor 120 may transmit the sensing information to the processor 150. The processor 150 may perform various operations based on the sensing information obtained through the sensor 120.

The filter 130 is configured to move gas, fine dust, or the like, contained in the air. For example, the filter 130 may include a hybrid filter, a pre filter, a HEPA filter, a deodorization filter, a carbon dioxide adsorbing filter, or the like.

The hybrid filter may be a filter including a bead-shaped activated carbon and a photocatalyst, and may remove or adsorb gas by decomposing gas contained in the air. The diameter of the beads may be between 0.5 mm and 5 mm, but this is merely an example and may be implemented in various sizes. The photocatalyst may be titanium dioxide ($TiO_2$), but this is merely exemplary and may be zinc oxide (ZnO), cadmium sulfide (CdS), zirconium oxide ($ZrO_2$), tungsten oxide ($WO_3$), and bismuth oxide ($BiO_2$ or $Bi_2O_3$). The structure of the photocatalyst and activated carbon will be described in detail with reference to FIGS. 3A and 3B.

In the pre filter, relatively large dust particles contained in the suctioned air may be filtered. The HEPA filter is configured to filter fine dust what has not been filtered in the pre filter and may be formed of glass fiber.

The LED 140 is a configuration for emitting light to the photocatalyst. In an embodiment, when power is turned on by the control of the processor 150, the LED 140 may emit a light source suitable for the photocatalyst to show a response. For example, the LED 140 may emit light having a wavelength range such as white light, red light, green light, blue light, ultraviolet (10-400 nm), visible light (400-700 nm), infrared rays (total, 700 nm-1 mm), near-infrared (NIR) (0.75-1.4 µm), short wave infrared (SWIR) (1.4-3 µm), medium-wave infrared (MWIR) (3-8 µm), long wavelength infrared (LWIR) (8-15 µm), far-infrared radiation (FIR) (15-1000 µm), or the like.

The processor 150 may control the overall operation and functionality of the air purifier. The processor 150 may identify whether the concentration of odor in the air sensed through the odor sensor exceeds the first threshold. In another embodiment, upon receiving the concentration of odor information from the air received through the communicator 180 from the external device, the processor 150 may identify whether the concentration of odor in the air exceeds the first threshold value through the received odor information.

If it is identified that the concentration of odor in the air exceeds the first threshold value, the processor 150 may drive the first fan to absorb air to reduce concentration of odor in the air by using a hybrid filter.

When the concentration of odor in the air sensed through the odor sensor after the threshold time since driving of the first fan is not reduced to the second threshold value greater than or equal to the first threshold value, the processor 150 may control the LED module 140 to emit light to the photocatalyst based on the concentration of carbon dioxide in the air, and may regenerate the hybrid filter.

If the concentration of odor in the air is not reduced to a second threshold greater than or equal to the first threshold, the processor 150 may identify whether the concentration of carbon dioxide in the air exceeds the third threshold. Meanwhile, the processor 150 may detect the concentration of carbon dioxide in the air through the carbon dioxide sensor, but this is merely exemplary, and the processor 150 may receive carbon dioxide concentration information of the air from the external device through the communicator 180.

In an embodiment, if it is identified that the concentration of carbon dioxide does not exceed the third threshold, the processor 150 may control the LED 140 to stop the operation of the first fan and emit light to the photocatalyst to regenerate the hybrid filter.

In another embodiment, if the concentration of carbon dioxide in the air exceeds the third threshold value, the processor 150 may control the air conditioner (or air conditioning unit) 185 such that the concentration of carbon dioxide in the air is reduced below or equal to the third threshold value. The processor 150 may drive the first fan again to suction the air and may control an air conditioning unit 185 to adsorb and remove carbon dioxide contained in the air. If the concentration of carbon dioxide in the air is reduced below or equal to the third threshold value, the processor 150 may control the LED 140 to stop the operation of the first fan and emit light to the photocatalyst.

In an embodiment, when the operation of the first fan is stopped, the processor 150 may control the heater 165 to heat the hybrid filter, and may increase the rate of diffusion of the gas adsorbed on the activated carbon to the photocatalyst. In another embodiment, when the operation of the first fan is stopped, the processor 150 may drive the second fan to circulate the air inside the air purifier 100, thereby increasing the rate of diffusion of the gas adsorbed on the activated carbon to the photocatalyst.

In another embodiment, the processor 150 may control a traveling unit 175 to move the air purifier 100 to a space in which the concentration of odor in the air exceeds the first threshold value. If information about a space in which the concentration of odor in the air exceeds the first threshold value is received from the external device, the processor 150 may control the traveling unit 175 to move to a space in which the concentration of odor in the air exceeds the first threshold value based on the received information.

In another embodiment, the processor 150 may control the traveling unit 175 to move the air purifier 100 to a space in which the concentration of carbon dioxide in the air exceeds a third threshold value. When receiving information about a space in which the carbon dioxide concentration in the air exceeds the third threshold value from the external device, the processor 150 may control the traveling unit 175 to move to the space in which the concentration of carbon dioxide in the air exceeds the third threshold value based on the received information.

The processor 150 may be implemented with, for example, and without limitation, a digital signal processor (DSP) for processing of a digital signal, a microprocessor, a time controller (TCON), or the like. The processor 150 may include, for example, and without limitation, one or more among a central processor (CPU), a micro controller unit (MCU), a micro processor (MPU), a controller, an application processor (AP), a communication processor (CP), an advanced reduced instruction set computing (RISC) machine (ARM) processor, or may be defined as a corresponding term. The processor 150 may be implemented in a system on chip (SoC) type or a large scale integration (LSI) type which a processing algorithm is built therein, application specific integrated circuit (ASIC), or in a field programmable gate array (FPGA) type. The processor 150 may perform various functions by executing computer executable instructions stored in the memory 195.

Figure 2B:
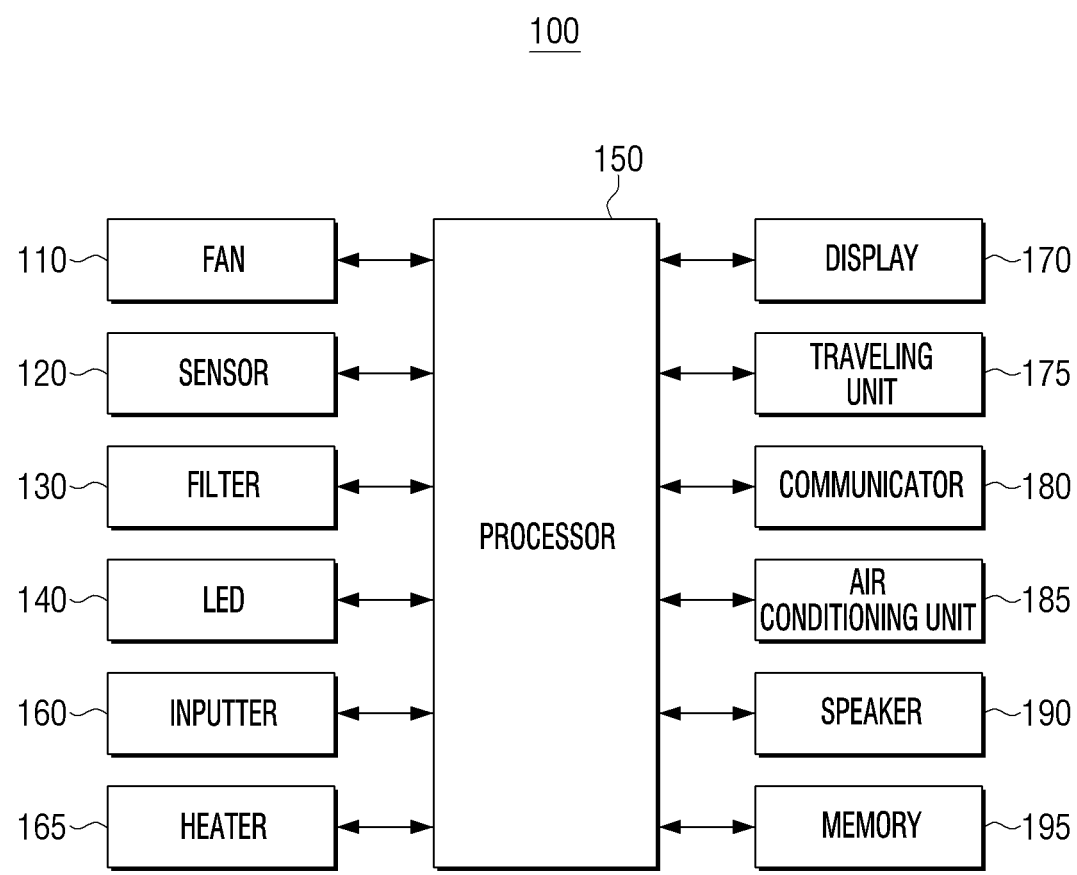
FIG. 2B is a block diagram illustrating a configuration of an air purifier in detail according to an embodiment of the disclosure.

FIG. 2B is a block diagram illustrating the configuration of the air purifier 100 in detail, according to an embodiment of the disclosure.

Referring to FIG. 2B, the air purifier 100 may include the fan 110, the sensor 120, the filter 130, the LED 140, the processor 150, an inputter 160, a heater 165, a display 170, a traveling unit 175, a communicator 180, an air conditioning unit 185, a speaker 190, and a memory 195. Since the fan 110, the sensor 120, the filter 130, the LED 140, and the processor 150 have been described with reference to FIG. 2A, a description thereof will be omitted.

The inputter 160 may receive various user inputs and transmit the user inputs to the processor 150. The inputter 160 may include a touch sensor, a (digital) pen sensor, a pressure sensor, a key, or a microphone. The inputter 160 may be implemented as another input device (e.g., keyboard, mouse, motion inputter, or the like).

The inputter 160 may obtain an input signal according to a user command input through a user interface (UI) capable of controlling an operation of the air purifier 100. The inputter 160 may transmit the input signal to the processor 150.

The heater 165 is configured to heat a hybrid filter, or the like. For example, the heater 165 may increase speed of diffusion of gas adsorbed to the activated carbon to the photocatalyst by heating the hybrid filter by the control of the processor 150.

The display 170 may display various information by the control of the processor 150. In an embodiment, the display 170 may display a message to close an external window or a message to ventilate indoor air by the control of the processor 150. The display 170 may display a UI capable of controlling the air purifier 100.

The display 170 may be implemented as a touch screen along with a touch panel. The embodiment is not limited thereto and the display 170 may be implemented differently according to the types of the air purifier 100.

The traveling unit 175 may move the air purifier 100, and may include a motor and a plurality of wheels. The traveling unit 175 may move to a space in which concentration of odor in the air exceeds a first threshold value or a space in which the concentration of carbon dioxide in the air exceeds a third threshold value in accordance with the control of the processor 150.

The communicator 180 may communicate with an external device. Communicatively connecting the communicator 180 with the external device may include communication via a third device (e.g., a relay, a hub, an access point, a server, a gateway, or the like).

The communicator 180 may include various communication modules to communicate with the external device or external server. For example, the communicator 180 may include a wireless communication module, for example, a cellular communication module using at least one of long term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), or the like. As another example, the wireless communication module may include, for example, WiFi, Bluetooth, Bluetooth low energy (BLE), ZigBee, radio frequency (RF), body area network (BAN), or the like.

In an embodiment, the communicator 180 may receive concentration information of carbon dioxide or information about concentration of odor in the air from an external device. An embodiment related to an external device will be described in detail with reference to FIG. 7.

The air conditioning unit 185 is configured to remove carbon dioxide in the air and may include a carbon dioxide filter. In an embodiment, the air conditioning unit 185 may adsorb carbon dioxide in the air through the carbon dioxide filter and may reduce the concentration of carbon dioxide in the air. The carbon dioxide adsorbed to the carbon dioxide adsorption filter may be removed through light emitted from the LED 140.

The speaker 190 outputs various kinds of alarm sound or voice messages as well as various audio data in which various processing operations such as decoding, amplification, and noise filtering are performed by an audio processor (not shown). The speaker 190 may output a message to close an external window or a message to ventilate indoor air. A configuration for outputting audio may be implemented as the speaker 190, but this is merely an embodiment, but may be implemented as an output terminal capable of outputting audio data.

The memory 195 may store programs or data for controlling the air purifier 100. The memory 195 may store control program or control data for controlling the air purifier 100 or may memorize a user input or function command input through the inputter 160, or a control signal output by the processor 150. The memory 195 may be implemented as a non-volatile memory, a volatile memory, a flash-memory, a hard disk drive (HDD), slid state drive (SSD), or the like. The memory 195 may be accessed by the processor 150, and may perform reading, recording, modifying, deleting, updating, or the like, of data by the processor 150. The term memory may the read only memory (ROM), random access memory (RAM) in the air purifier 100, or a memory card (for example, micro secure digital (SD) card, a memory stick) mounted in the air purifier 100.

Figure 3A:
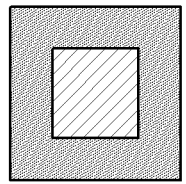
FIG. 3A is a diagram illustrating a configuration of a hybrid filter and a light emitting diode (LED) according to an embodiment of the disclosure.
Figure 3B:
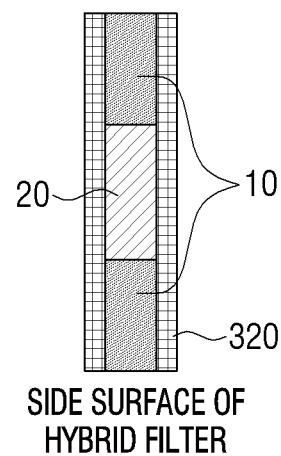
FIG. 3B is a diagram illustrating a side surface of the hybrid filter according to an embodiment of the disclosure.

FIGS. 3A and 3B are diagrams illustrating a configuration of a hybrid filter and a light emitting diode (LED) according to various embodiments of the disclosure. FIG. 3A is a diagram illustrating a front side of the hybrid filter and the LED according to an embodiment and FIG. 3B is a diagram illustrating a side of the hybrid filter according to an embodiment.

Referring to FIG. 3A, the hybrid filter may be configured in various ways, such as activated carbon 10 which is embodied in the form of beads and photocatalyst 20. Referring to FIG. 3A, the activated carbon 10 and the photocatalyst 20 are formed in four forms, but this is merely an embodiment and may be variously configured according to the type of the air purifier 100.

The LED 140 may be arranged in an area where the photocatalyst 20 is located. In an embodiment, the LED 140 may be arranged on a heat sinking plane 310 or inside the heat sinking plane 310.

As illustrated in Example 1, the photocatalyst 20 may be disposed at a central area of a filter and the activated carbon 10 may be disposed at a remaining portion. The LED 140 may be disposed at a central area of the filter in which the photocatalyst 20 is located to emit light to the photocatalyst 20.

As illustrated in Example 2, the photocatalyst 20 may be disposed in the upper and lower regions of the filter and the activated carbon 10 may be disposed in the remaining portion. In order to emit light to the photocatalyst 20, the LED 140 may be disposed at the top and bottom areas of the filter in which the photocatalyst 20 is positioned.

As illustrated in Example 3, the photocatalyst 20 may be disposed in the central region of the filter in a horizontal direction and the activated carbon 10 may be disposed in the remaining portions. The LED 140 may be disposed in a horizontal direction at a central region of the filter in which the photocatalyst 20 is located to emit light to the photocatalyst 20.

As illustrated in Example 4, the photocatalyst 20 and the activated carbon 10 may be disposed in a horizontal direction in a cross manner. The LED 140 may be disposed only in a region where the photocatalyst is located to emit light to the photocatalyst 20.

For example, FIG. 3B illustrates the hybrid filter of Example 3 in FIG. 3A in a side view. The hybrid filter may include a net 320 to fix the bead-type photocatalyst 20 and the activated carbon 10. The net 320 may be composed of metal or polymer.

Figure 4:
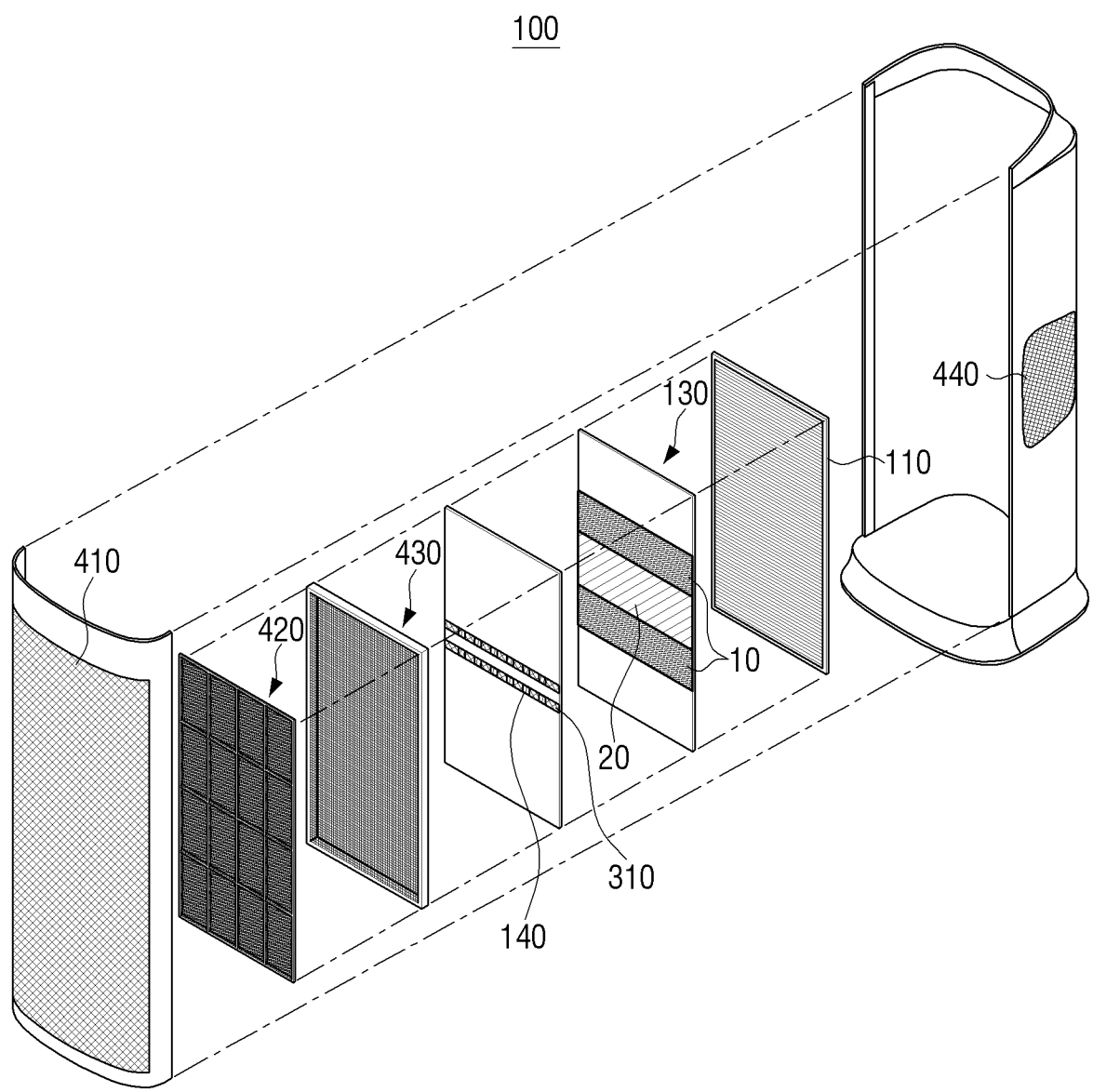
FIG. 4 is a diagram illustrating an element included in an air purifier according to an embodiment of the disclosure.

FIG. 4 is a diagram illustrating an element included in the air purifier 100 according to an embodiment of the disclosure.

To be specific, FIG. 4 is a diagram illustrating an order of arrangement of the configuration included in the air purifier 100. The arrangement order of FIG. 4 is exemplary and may be diverse.

An air permeable membrane 410 is a membrane through which only air may be permeable. A pre filter 420 may remove a relatively large dust included in the air that passed the air permeable membrane 410 to prevent contamination of another filter and fan. The HEPA filter 430 may remove fine dust included in the air that passed the pre filter 420 to prevent contamination of another filter and fan.

The LED 140 may be disposed in a region where the photocatalyst 20 is located so as to emit light to the photocatalyst 20 included in the hybrid filter 130. In FIG. 4, the LED 140 is located on the front surface of the hybrid filter 130, but this is merely an embodiment and the LED 140 may be located on the rear surface of the hybrid filter 130. The hybrid filter 130 may reduce the concentration of odor in the air and prevent other fans from being contaminated by removing or adsorbing gas contained in the air passing through the pre filter 420 and the HEPA filter 430.

The first fan 110 may be disposed at a rear direction of the hybrid filter 130 to suction air. The air passing through a plurality of filters may be discharged through an outlet 440.

Figure 5:
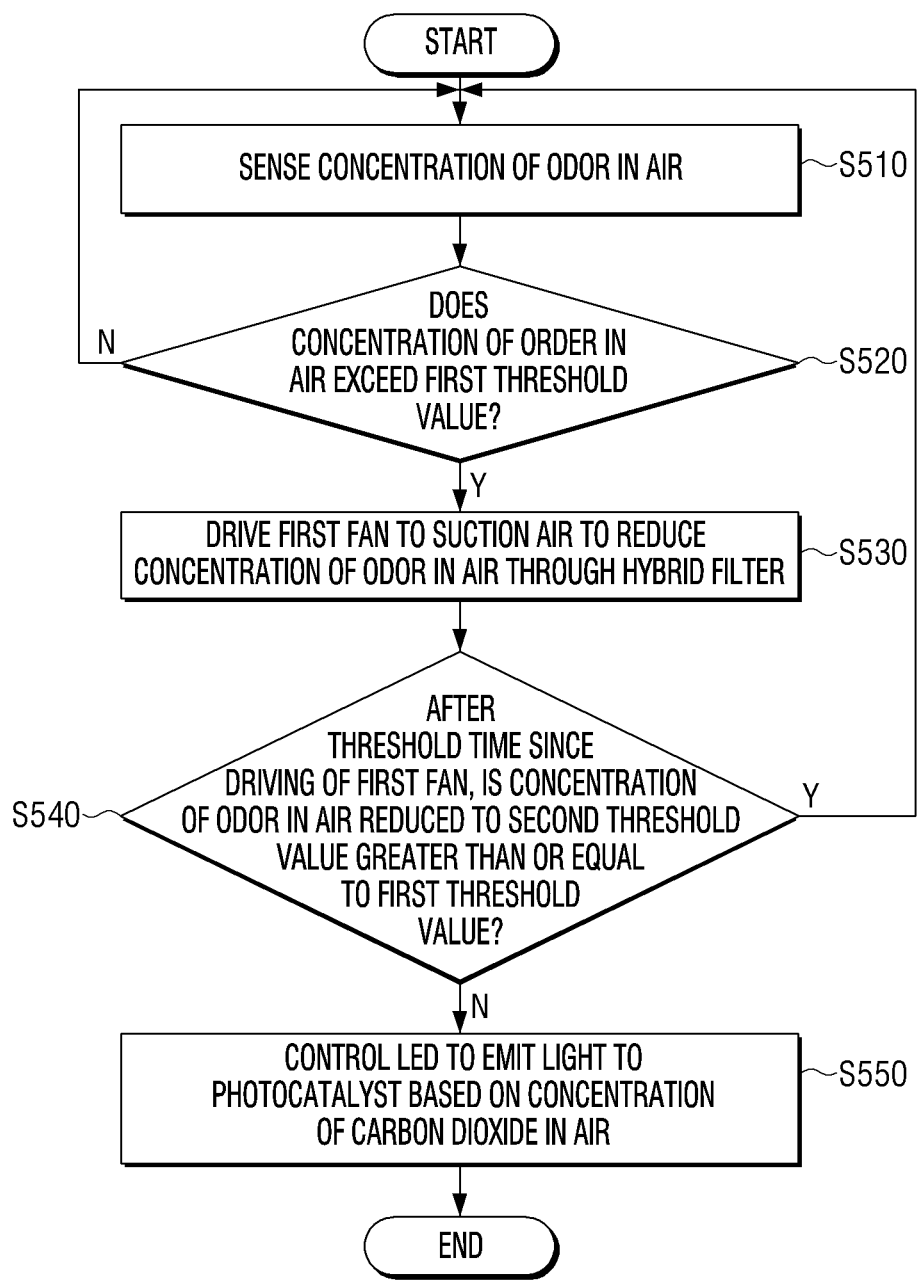
FIG. 5 is a flowchart illustrating a process of purifying air by driving a fan based on concentration of odor in the air by the air purifier according to an embodiment of the disclosure.

FIG. 5 is a flowchart illustrating a process of purifying air by driving a fan based on concentration of odor in the air by the air purifier 100 according to an embodiment of the disclosure.

Referring to FIG. 5, in an embodiment, the air purifier 100 may sense the concentration of odor in the air through the odor sensor in operation S510. In another embodiment, the air purifier 100 may receive information about concentration of odor in air from an external device.

In operation S520, the air purifier 100 may identify whether concentration of odor in the air exceeds a first threshold value. If the concentration of odor in the air does not exceed the first threshold value, the air purifier 100 may sense the concentration of odor in the air again after a predetermined time. When the concentration of odor in the air does not exceed the first threshold value, the air purifier 100 may not perform an operation for purifying the air, and may determine whether to purify air by sensing the concentration of odor again after a predetermined time.

When the concentration of odor in the air exceeds the first threshold value, the air purifier 100 may drive the first fan to suction air to reduce the concentration of odor in the air through the hybrid filter in operation S530.

After the threshold time since driving of the first fan, the air purifier 100 may identify whether the concentration of odor in the air is reduced to a second threshold value greater than or equal to the first threshold value in operation S540. After the threshold time since driving of the first fan, the air purifier 100 may identify whether the hybrid filter is normally operating through whether the concentration of odor in the air is reduced to a second threshold value greater than or equal to the first threshold value. Even after the threshold time since driving of the first fan, if the concentration of odor in the air is not reduced to the second threshold, the air purifier 100 may identify that the performance of the hybrid filter is degraded.

According to an embodiment, after the threshold time since driving of the first fan, if the concentration of odor in the air is reduced to the second threshold value above or equal to the first threshold value, the air purifier 100 may sense the concentration of odor in the air through the odor sensor after a predetermined time. When the hybrid filter operates normally and the concentration of odor in the air is reduced to a second threshold value greater than or equal to the first threshold value, the air purifier 100 may identify whether to drive the first fan based on the concentration of odor in the air after a predetermined time.

After the threshold time since driving of the first fan, when the concentration of odor in the air is not reduced to the second threshold value above or equal to the first threshold value, the air purifier 100 may control the LED to emit light to the photocatalyst based on the concentration of carbon dioxide in the air in operation S550. An embodiment of emitting light to the photocatalyst based on the concentration of carbon dioxide will be described in detail with reference to FIG. 6.

Figure 6:
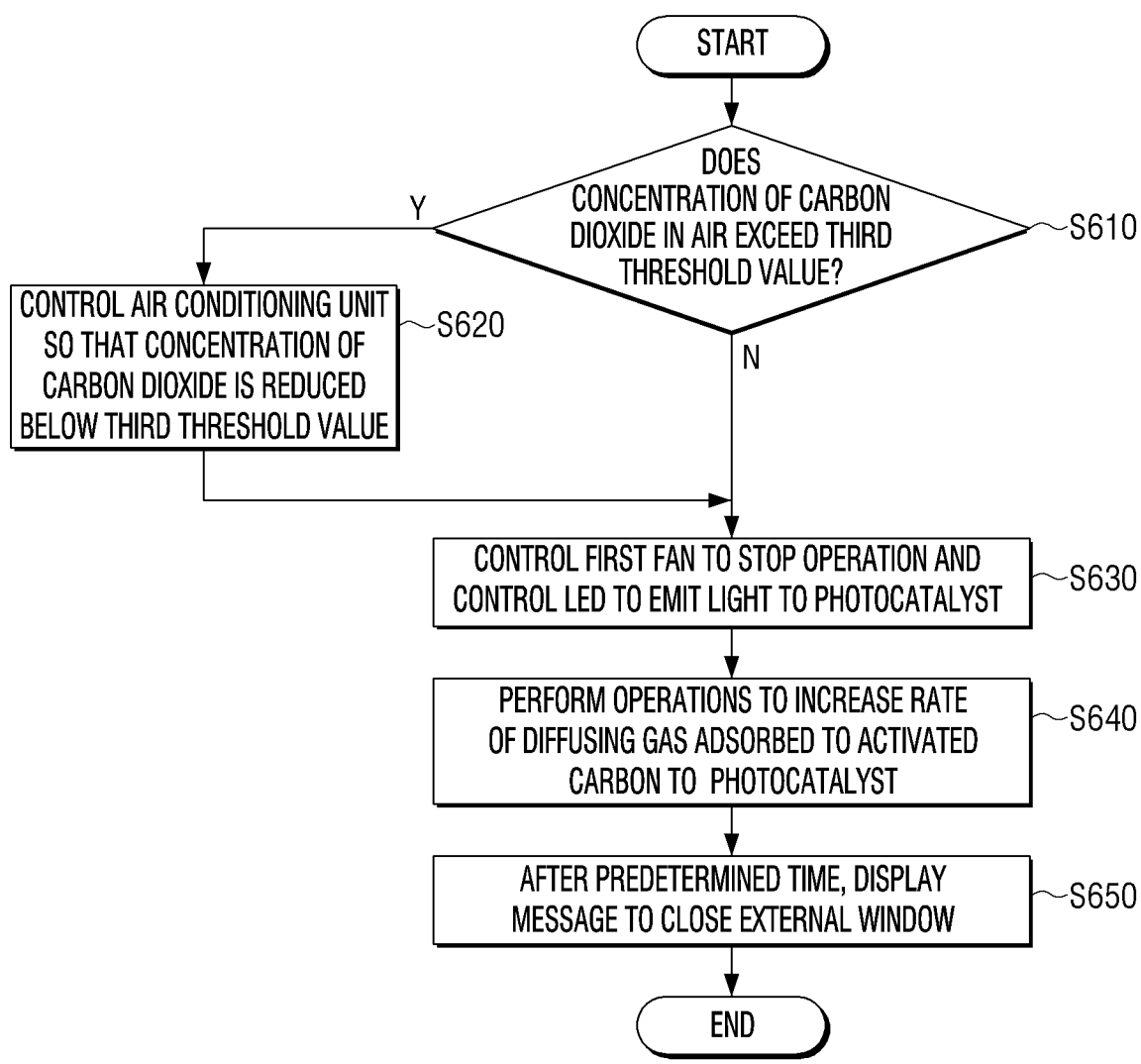
FIG. 6 is a flowchart illustrating a process of regenerating a filter based on concentration of carbon dioxide in the air by the air purifier according to an embodiment of the disclosure.

FIG. 6 is a flowchart illustrating a process of regenerating a filter based on concentration of carbon dioxide in the air by the air purifier 100 according to an embodiment of the disclosure. FIG. 6 is a flowchart illustrating the process of S550 of FIG. 5 in detail.

Referring to FIG. 6, the air purifier 100 may identify whether the concentration of carbon dioxide in the air exceeds a third threshold value in operation S610. When the air purifier 100 irradiates light to the photocatalyst through the LED, a radical is generated, the radical is adsorbed to the gas or activated carbon contained in the air, and the gas diffused into the photocatalyst is decomposed, and carbon dioxide may be generated. The air purifier 100 may identify whether the concentration of carbon dioxide in the air exceeds the third threshold value in order to prevent the carbon dioxide concentration in the air from increasing beyond the third threshold.

In an embodiment, the air purifier 100 may sense the concentration of carbon dioxide in the air through the carbon dioxide sensor. In another embodiment, the air purifier 100 may receive carbon dioxide concentration information from an external device (e.g., an external device 200).

According to an embodiment, when the concentration of carbon dioxide in the air exceeds the third threshold value, the air purifier 100 may control the air conditioning unit so that the concentration of carbon dioxide is reduced below the third threshold value in operation S620. The air purifier 100 may drive the first fan to suction air and control the air conditioning unit to adsorb and remove carbon dioxide in the air. In another embodiment, the air purifier 100 may display a message including meaning to reduce the concentration of carbon dioxide in the air by ventilating indoor air or may output the message in a voice form.

If the concentration of carbon dioxide in the air decreases below the third threshold value after the air conditioning unit is controlled to operate, the air conditioner may control the first fan to stop the operation and control the LED to emit light to the photocatalyst in operation S630.

In another embodiment, when the concentration of carbon dioxide in the air is less than or equal to the third threshold value, the air purifier 100 may not control the air conditioning unit and control to stop the operation of the first fan, and may control the LED to emit light to the photocatalyst.

The air purifier 100 may perform various operations to increase a rate of diffusing gas adsorbed to the activated carbon to the photocatalyst in operation S640. However, in an embodiment, the air purifier 100 may control the operation of the first fan to stop the operation and control the LED to emit light to the photocatalyst in operation S630, or to increase the rate of diffusion of the gas adsorbed on the activated carbon to the photocatalyst after a predetermined time.

In an embodiment, the air purifier 100 may control the heater to heat the hybrid filter, and may increase the rate of diffusion of the gas adsorbed on the activated carbon to the photocatalyst. In another embodiment, the air purifier 100 may drive a second fan to circulate the inside of the air purifier, and may increase the rate of diffusion of the gas adsorbed on the activated carbon to the photocatalyst. In the above-described embodiment, the air purifier 100 may rapidly diffuse the gas adsorbed on the activated carbon to the photocatalyst and decompose the diffused gas using the photocatalyst to maintain the initial performance of the hybrid filter.

After a predetermined time, the air purifier 100 may display a message to close the external window in operation S650. After a predetermined time from the generation of carbon dioxide as the gas generated by removing the air adsorbed on the activated carbon is removed, the air purifier 100 may display a message to close the external window or output the message in the form of a voice. When the air purifier 100 operates in a state where the external window is opened, the efficiency of the air purifier 100 may be reduced. Accordingly, the air purifier 100 may increase efficiency by making the user close the external window. The air purifier 100 may sense the concentration of odor in the air through the odor sensor and determine whether to purify the air by driving the first fan based on the sensed concentration of odor.

FIG. 7 is a diagram illustrating a process of obtaining carbon dioxide information by the air purifier 100 from an external device 200 according to an embodiment of the disclosure. The operation performed by the air purifier based on concentration of odor and concentration of carbon dioxide has been described in FIGS. 5 and 6 in detail and will not be further described.

Referring to FIG. 7, the air purifier 100 may sense concentration of odor in the air in operation S710. In another embodiment, the air purifier 100 may receive information about concentration of odor in the air from the external device 200.

The air purifier 100 may identify whether concentration of odor in the air exceeds a first threshold value in operation S720. If the concentration of odor in the air exceeds the first threshold value, the air purifier 100 may drive a first fan to suction air to reduce concentration of odor in the air using the hybrid filter in operation S730. In operation S740, the air purifier 100 may identify whether concentration of odor in the air is reduced to a second threshold value greater than or equal to a first threshold value. If the concentration of odor in the air is not reduced to a second threshold value greater than or equal to the first threshold value, the air purifier 100 may transmit a signal requesting carbon dioxide concentration information in the air in operation S750. Upon receiving a signal requesting carbon dioxide concentration information in the air, the external device 200 may obtain carbon dioxide concentration information in the air in operation S760. The external device 200 may transmit the carbon dioxide concentration information of the obtained air to the air purifier 100 in operation S770. The air purifier 100 may control the LED to emit light to the photocatalyst based on the received information about concentration of carbon dioxide in the air in operation S780. That is, even if at least one of the odor sensor and the carbon dioxide sensor is removed, the air purifier 100 may obtain the information about the concentration of odor and the concentration of carbon dioxide in the air through the external device 200.

Figure 8A:
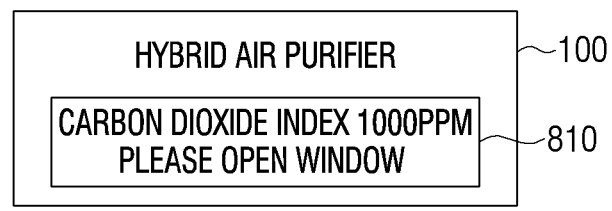
FIG. 8A is a diagram illustrating indicating a message related to carbon dioxide index by the air purifier according to an embodiment of the disclosure.
Figure 8B:
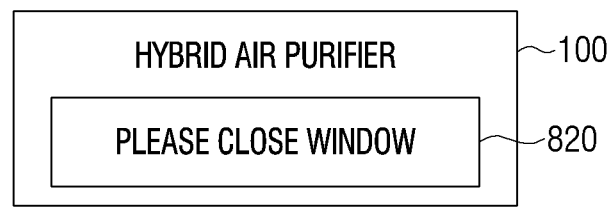
FIG. 8B is a diagram illustrating indicating a message related to carbon dioxide index by the air purifier according to an embodiment of the disclosure.

FIGS. 8A and 8B are diagrams illustrating indicating a message related to carbon dioxide index by the air purifier 100 according to various embodiments of the disclosure.

Referring to FIG. 8A, when the concentration of carbon dioxide in the air exceeds a third threshold (e.g., 1000 ppm), the air purifier 100 may indicate a message 810 to open the external window along with the concentration of carbon dioxide in the current air. In another embodiment, the air purifier 100 may output text corresponding to the message 810 in the form of voice.

In another embodiment, the air purifier 100 may emit light through the LED to decompose the air adsorbed on the activated carbon, and may display a message 820 to close the external window after a predetermined time. The air purifier 100 may display a message 820 to close the external window to increase the efficiency of the air purifier 100. In another embodiment, the air purifier 100 may output text corresponding to the message 820 in a voice form.

Figure 9:
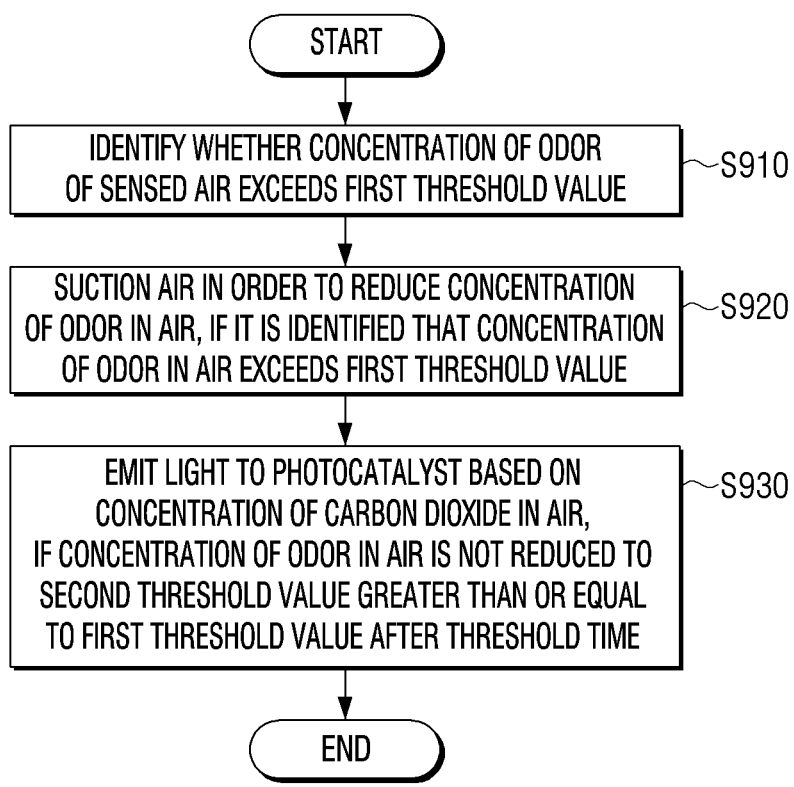
FIG. 9 is a flowchart illustrating a method for controlling an air purifier according to an embodiment of the disclosure.

FIG. 9 is a flowchart illustrating a method for controlling the air purifier 100 according to an embodiment of the disclosure.

Referring to FIG. 9, the air purifier 100 may identify whether concentration of odor of the sensed air exceeds a first threshold value in operation S910. The air purifier 100 may sense concentration of odor in the air through the odor sensor. In another embodiment, the air purifier 100 may receive information about concentration of odor from the external device.

If it is identified that the concentration of odor in the air exceeds the first threshold value, the air purifier 100 may drive the first fan to suction air in order to reduce the concentration of odor in the air in operation S920. The air purifier 100 may drive the first fan to suction air in order to reduce the concentration of odor in the air using the hybrid filter. According to an embodiment, the air purifier may reduce the concentration of air by adsorbing gas contained in the air through activated carbon implemented in the form of beads included in the hybrid filter. The air purifier 100 may generate radicals by emitting light to the photocatalyst implemented in the form of beads included in the hybrid filter, and may decompose the gas contained in the air through the generated radicals to reduce the concentration of odor in the air.

After the threshold time since driving the first fan, if the concentration of odor in the air is not reduced to the second threshold value above or equal to the first threshold value, the air purifier 100 may emit light to the photocatalyst based on the concentration of the carbon dioxide in the air in operation S930. Even after the threshold time from driving the first fan, if the concentration of odor in the air is not reduced to the second threshold, the gas adsorbed on the activated carbon may be saturated and the performance of the hybrid filter may be deteriorated. Therefore, in order to regenerate the hybrid filter, the air purifier 100 may emit light to the photocatalyst in the air based on the concentration of carbon dioxide in the air to decompose the gas adsorbed to the diffused activated carbon.

According to an embodiment, when the concentration of carbon dioxide in the air exceeds a third threshold value, the air purifier 100 may drive the first fan to suction air and control the air conditioner to adsorb and remove carbon dioxide of the suctioned air. If the concentration of carbon dioxide in the air is less than or equal to the third threshold value, the air purifier 100 may stop the operation of the first fan and emit light to the photocatalyst through the LED to remove the gas adsorbed on the activated carbon.

In another embodiment, when the concentration of carbon dioxide in the air is less than or equal to the third threshold value, the air purifier 100 may not control the air conditioning unit but immediately stop the operation of the first fan and emit light to the photocatalyst through the LED to remove the gas adsorbed on the activated carbon.

The various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor 150, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media. For example, "non-transitory storage medium" may include a buffer for temporarily storing data.

According to an embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An air purifier comprising:
   a first fan;
   a communicator including a circuit;
   an odor sensor configured to sense a concentration of odor in air surrounding the air purifier;
   a carbon dioxide sensor configured to sense a concentration of carbon dioxide in the air;
   a hybrid filter comprising a photocatalyst disposed in a specific region of the hybrid filter and activated carbon disposed in a remaining region of the hybrid filter excluding the specific region;
   a light emitting diode (LED) configured to emit light and being arranged in an area where the photocatalyst included in the hybrid filter is positioned; and
   a processor configured to:
      identify whether the concentration of odor in the air sensed by the odor sensor exceeds a first threshold value,
      based on the concentration of odor in the air exceeding the first threshold value, drive the first fan to suction the air to reduce the concentration of odor in the air by using the hybrid filter,
      monitor the concentration of odor in the air for a threshold amount of time after initiating the driving of the first fan,
      determine whether the concentration of odor in the air is reduced to a second threshold value equal to or greater than the first threshold value for the threshold amount of time, and
      if the concentration of odor in the air is not reduced to the second threshold value, control the LED to emit light to the photocatalyst based on the concentration of carbon dioxide in the air sensed by at least one carbon dioxide sensor.

2. The air purifier of claim 1, wherein the activated carbon and the photocatalyst are configured in a form of a bead.

3. The air purifier of claim 1, wherein the processor is further configured to:
   based on the concentration of carbon dioxide in the air sensed by the carbon dioxide sensor of the air purifier, control the LED to emit light to the photocatalyst.

4. The air purifier of claim 1, wherein the processor is further configured to:
   receive, through the communicator from an external device including the at least one carbon dioxide sensor, information about the concentration of carbon dioxide in the air, and
   based on the information about the concentration of carbon dioxide in the air, control the LED to emit light to the photocatalyst.

5. The air purifier of claim 1, wherein the processor is further configured to:
   identify whether the concentration of carbon dioxide in the air exceeds a third threshold value, and
   based on the concentration of carbon dioxide in the air not exceeding the third threshold value, control the first fan to stop and control the LED to emit light to the photocatalyst.

6. The air purifier of claim 5, further comprising:
   an air conditioner,
   wherein the processor is further configured to:
      based on identifying that the concentration of carbon dioxide exceeds the third threshold value, control the air conditioner to operate so that the concentration of carbon dioxide in the air is reduced to less than or equal to the third threshold value, and
      based on the concentration of carbon dioxide in the air being reduced to the third threshold value or less after controlling the air conditioner to operate, control the first fan to stop and control the LED to emit light to the photocatalyst.

7. The air purifier of claim 5, further comprising:
   a heater,
   wherein the processor is further configured to:
      based on the first fan being stopped, increase a rate of diffusing gas adsorbed on the activated carbon to the photocatalyst by controlling the heater to heat the hybrid filter.

8. The air purifier of claim 5, further comprising:
   a second fan,
   wherein the processor is further configured to:
      based on the first fan being stopped, increase a rate of diffusing gas adsorbed on the activated carbon to the photocatalyst by driving the second fan.

9. The air purifier of claim 1, wherein at least one of a pre filter or a high efficiency particulate air (HEPA) filter is disposed on a surface of the LED.

10. The air purifier of claim 1, further comprising:
    a display,
    wherein the processor is further configured to:
       based on the concentration of carbon dioxide in the air, control the display to display a message to close an external window after controlling the LED to emit light to the photocatalyst.

11. The air purifier of claim 1, wherein the photocatalyst is disposed in a central region of the hybrid filter and the activated carbon is disposed outside the central region above the central region and below the central region.

\* \* \* \* \*